3,518,265
PROCESS FOR THE PREPARATION OF 1,3,5-TRIACRYLYL PERHYDRO-s-TRIAZINES
Warren L. Beears, Brecksville, Ohio, assignor to The B. F. Goodrich Company, New York, N.Y., a corporation of New York
No Drawing. Filed Oct. 25, 1968, Ser. No. 770,818
Int. Cl. C07d 55/12
U.S. Cl. 260—248     7 Claims

ABSTRACT OF THE DISCLOSURE

In the reaction of $\alpha,\beta$-olefinically unsaturated nitriles and formaldehyde with an acid catalyst, the formation of polymeric by-product has been minimized while high yields of perhydro-s-triazine are obtained. To obtain these improved results the reaction is conducted in a chlorinated hydrocarbon solvent with an excess of the $\alpha,\beta$-olefinically unsaturated nitrile and in the presence of an acid anhydride.

BACKGROUND OF THE INVENTION

The preparation of perhydro-s-triazine via the acid-catalyzed reaction of nitriles with formaldehyde is described in U.S. Pat. 2,568,620. The preparation of perhydro-s-triazines in chlorinated solvents has also been reported by W. D. Emmons et al. in J. Amer. Chem. Soc., 74, 5524–5525 (1952). These reactions are complicated, however, when $\alpha,\beta$-olefinically unsaturated nitriles are employed. With $\alpha,\beta$-olefinically unsaturated nitriles, polymeric products, believed to be predominantly polynitriles and polyamides are formed. Often as high as 20% or more of the product obtained is polymeric impurity.

It has been found that certain of these polymeric impurities can be removed by extraction with suitable solvents, but other polymeric impurities have similar solubilities to the perhydro-s-triazine and cannot be readily removed using such extraction techniques. It is advantageous in conducting the reaction of $\alpha,\beta$-olefinically unsaturated nitriles with formaldehyde to minimize the formation of polymeric by-products, and especially polymeric impurities of the latter type, in order to obtain high purity perhydro-s-triazines in good yield.

SUMMARY OF THE INVENTION

I have now discovered an improvement whereby the overall amount of polymeric impurities formed in the acid-catalyzed reaction of $\alpha,\beta$-olefinically unsaturated nitriles and formaldehyde is markedly reduced and polymeric impurities having similar solubility characteristics with the perhydro-s-triazines are essentially eliminated. While reducing the amounts of polymeric impurities formed, the present invention also provides high yields of the perhydro-s-triazines.

It was unexpected to find in the reaction of $\alpha,\beta$-olefinically unsaturated nitriles with formaldehyde using chlorinated hydrocarbons as the reaction media with an acid catalyst the amount of polymeric by-products formed during the reaction could be minimized while high yields of perhydro-s-triazine were obtained. This result is achieved by conducting the present process with about 5 to 30% excess $\alpha,\beta$-olefinically unsaturated nitrile based on formaldehyde and about 0.05 to 0.5 mol of an acid anhydride per mol formaldehyde. The concentration of the acid catalyst typically will range from about 0.2 gram to about 2.5 grams per mol formaldehyde.

DETAILED DESCRIPTION

The present improved process is directed to the reaction of $\alpha,\beta$-olefinically unsaturated nitriles with formaldehyde. The $\alpha,\beta$-olefinically unsaturated nitriles which may be employed have the general formula

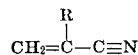

wherein R is an alkyl group containing from 1 to 4 carbon atoms such as methyl, ethyl, propyl and butyl. Other $\alpha$-substituted nitriles such as, for example, $\alpha$-phenyl acrylonitrile, $\alpha$-tolyl acrylonitrile, $\alpha$-benzyl acrylonitrile, $\alpha$-phenylhexyl acrylonitrile and the like may be employed in the present process if desired.

The formaldehyde employed should be substantially anhydrous. Accordingly, the formaldehyde will be obtained from sources such as s-trioxane or paraformaldehyde which produce formaldehyde in the presence of acid or when heated.

Chlorinated hydrocarbon solvents such as carbon tetrachloride, ethylene dichloride, trichloroethylene, perchloroethylene, s-tetrachloroethane and the like are employed as the reaction medium for the process of the present invention. Excellent results have been obtained when carbon tetrachloride or perchloroethylene are employed. Typically, the solvent:formaldehyde weight ratio will range from about 25:1 to about 3:1.

An acid catalyst is utilized when conducting the process. In general, inorganic or organic acids such as sulfuric acid, phosphoric acid, hydrochloric acid, acetic acid, propionic acid, p-toluene sulfonic acid or the like can be employed. Best results have been obtained when concentrated sulfuric acid is the catalyst. The amount of acid catalyst employed will generally range between about 0.2 gram to 2.5 grams per mol of formaldehyde and, more preferably, between 0.5 gram and 1.5 grams.

Any anhydride formed by the elimination of a water molecule between two molecules of the acid, either identical or dissimilar, or between two carboxyl groups of a difunctional acid, may be employed for the present process. Such acid anhydrides include acetic anhydride, propionic anhydride, n-butyric anhydride, i-butyric anhydride, valeric anhydride, benzoic anhydride, succinic anhydride, phthalic anhydride and the like. Generally, those acid anhydrides which are most readily hydrolyzed are preferred for the present process. Excellent results have been obtained when acetic anhydride is used.

The reaction is effected by contacting the $\alpha,\beta$-olefinically unsaturated nitrile and the formaldehyde with the acid catalyst in the halogenated hydrocarbon solvent in the presence of the acid anhydride. Best results are obtained when the $\alpha,\beta$-olefinically unsaturated nitrile is slowly added to the solvent containing the acid catalyst prior to the introduction of the formaldehyde. In this way, localized high concentrations of the acid and the development of localized hot-spots within the reaction medium, both of which are conducive to the formation of polymeric materials, are avoided. The reaction temperature will generally range between about 50° C. and 110° C. Best results have been obtained at temperatures between about 60° C. and 90° C.

This process is significant since it provides a means to obtain high purity perhydro-s-triazine in good yield. This is accomplished by employing an excess of the $\alpha,\beta$-olefinically unsaturated nitrile in conjunction with an acid anhydride. The $\alpha,\beta$-olefinically unsaturated nitrile will be employed in about 5 to 30% molar excess based on the formaldehyde and more preferably in about 10 to 25% excess. The amount of acid anhydride employed will range between about 0.05 to 0.5 mol per mol of formaldehyde. More typically, about 0.08 to 0.25 mol acid anhydride per mol formaldehyde will be employed. When the prescribed amounts of α,β-olefinically unsaturated nitrile and acid anhydride are used, the overall amount of polymeric by-product formed is reduced to as low as about 1% of the perhydro-s-triazine. This reduction is even more significant in view of the fact that the polymeric materials which have similar solubilities with the perhydro-s-triazines, and are therefore impractical to remove, have been essentially eliminated. This is a marked improvement over previously known processes which typically gave crude perhydro-s-triazine containing 20% or more polymeric impurities. As a result of the present process, perhydro-s-triazines substantially free of any polymeric impurities are now possible.

The perhydro-s-triazines are useful for a wide variety of applications. They are polymerizable, either thermally or with a peroxide catalyst, to form homopolymers. Their ready polymerizability also makes them useful as co-monomers with styrene or other monomers and as cross-linking or vulcanizing agents (U.S. Pat. 2,958,672). Perhydro-s-triazines are also useful as insecticides, fungicides and as chemical intermediates.

The following examples serve to illustrate the invention more fully. All parts and percentages are on a weight basis unless otherwise indicated.

Example I 1,3,5-triacrylylperhydro-s-triazine was prepared in accordance with the present process by charging 250 ml. carbon tetrachloride containing 0.5 gram 2,6-di-t-butyl-cresol and 3.52 grams (1.32 grams/mol $CH_2O$) concentrated sulfuric acid to a one liter reactor equipped with a stirring means, condenser and a dropping funnel. To this solution 159 grams acrylonitrile (a 20% molar excess based on $CH_2O$) was added dropwise at a rapid rate. The solution was heated to reflux and 70 grams (2.5 mols) paraformaldehyde and 24.6 grams (0.096 mol/mol $CH_2O$) acetic anhydride suspended in 210 ml. carbon tetrachloride added. This addition was made in about one hour followed by 1½ hours heating at about 70° C. The reactor and its contents were cooled to room temperature and the reaction mixture filtered to give 184 grams 1,3,5-triacrylylperhydro-s-triazine. The product was dissolved in hot chloroform containing a small amount of 2,6-di-t-butyl-cresol and only 6.4 grams (3.5% of the total product) of insoluble polymeric material found to be present. The resulting 1,3,5-triacrylylperhydro-s-triazine after evaporation of the chloroform was analyzed by nuclear magnetic resonance spectroscopy, and any polyamide impurities were below the limits of detactability of the instrument. Thus, the present process provided pure, essentially polymer-free, 1,3,5-triacrylylperhydro-s-triazine in 85.7% yield. High purity 1,3,5-trimethacrylylperhydro-s-triazine was prepared in a similar manner using perchloroethylene as the reaction medium.

With a run identical to that described above, except that no acetic anhydride was employed, only 48% yield of crude 1,3,5-triacrylylperhydro-s-triazine was obtained. In addition to the low yield, the product contained a large amount of polymeric impurities. When the above experiment was repeated employing 0.148 mol acetic anhydride per mol formaldehyde, 82% yield of 1,3,5-triacrylylperhydro-s-triazine was obtained with no polyamide impurity detected by nuclear magnetic resonance analysis.

Repeating the above example with no excess of the acrylonitrile reduced the yield of the 1,3,5-triacrylylperhydro-s-triazine to about 68%, however, there was no polyamide discernible by nuclear magnetic resonance analysis.

Example II

To demonstrate the advantage of the present process, 1,3,5-triacrylylperhydro-s-triazine was prepared following the procedure described by Emmons et al. in J. Amer. Chem. Soc., 74, 5524–5525 (1952). Crude 1,3,5-triacrylylperhydro-s-triazine was recovered and found to contain 13.2% insoluble polymeric impurity upon treatment with hot chloroform. Nuclear magnetic resonance analysis of a chloroform extracted sample prepared following the Emmons et al. procedure indicated the presence of about 6 mol percent polyamide. The percent polyamide was determined assuming an average molecular weight of 480 for the polyamide. The average molecular weight was determined by nuclear magnetic resonance spectroscopy from the molecular structure determined for the pure polyamide, obtained by multiple (5×) recrystallization from carbon tetrachloride.

Example III

A reactor charged with 250 ml. carbon tetrachloride containing 0.5 gram 2,6-di-6-butyl-cresol and 3.2 grams concentrated sulfuric acid (1.28 grams/mol $CH_2O$) was stirred vigorously and 105 grams acrylonitrile added dropwise over a 20 minute period. The solution was then heated to reflux and a suspension of 54 grams acrylonitrile (3 mols total), 75 grams (2.5 mols) s-trioxane and 24.6 grams acetic anhydride (0.097 mol/mol $CH_2O$) in 225 ml. carbon tetrachloride added in about one hour. Upon completion of the addition reflux was maintained for one and one-half hours. Allowing the reaction mixture to cool and filtering 178.6 grams 1,3,5-triacrylylperhydro-s-triazine was obtained. This product was extracted with hot chloroform and found to contain only 7.05 grams (3.98%) insoluble polymeric materials. Analysis by nuclear magnetic resonance spectroscopy of the extracted 1,3,5 - triacrylylperhydro-s-triazine showed no polyamide present. The yield of pure 1,3,5-triacrylylprehydro-s-triazine was 82.3%.

Example IV

Following the procedure described in Example I except that 1.71 grams concentrated sulfuric acid (0.66 grams/mol $CH_2O$) was employed, 1,3,5-triacrylylperhydro-s-triazine was prepared after extraction with hot chloroform. Only about 1.76% by weight insoluble polymeric materials was removed upon extraction with hot chloroform. The 1,3,5 - triacrylylperhydro-s-triazine contained essentially no polyamide.

Example V

To demonstrate the use of perchloroethylene as the reaction medium a reactor was charged with 136 ml. perchloroethylene, 0.25 gram 2,6-di-t-butyl-p-cresol and 2.05 grams concentrated sulfuric acid. Acrylonitrile (95.5 grams; 1.8 mols) was added dropwise at 25–27° C. followed by the dropwise addition of a suspension of 13.3 grams acetic anhydride and 47.4 grams (1.5 mols) paraformaldehyde in 120 ml. perchloroethylene at about 70° C. After an additional hour of heating, the reaction product was treated with hot chloroform to remove 3.2% insoluble polymeric impurities. The resulting 1,3,5 - triacrylylperhydro-s-triazine (85% yield) was essentially free of all polymeric impurities, including polyamide.

Example VI

Essentially polymer-free 1,3,5-trimethacrylylperhydro-s-triazine was prepared in 64% yield using the process of this invention. The procedure employed in Example I was followed. The reaction was conducted in carbon tetrachloride (about 500 ml.) containing 0.5 gram 2,6-di-t-butyl-p-cresol with 3.42 grams concentrated sulfuric acid catalyst and 24.6 grams acetic anhydride. 201 grams (3 mols) methacrylonitrile and 79 grams paraformaldehyde were the reactants.

Example VII

The polymerizability of the 1,3,5-triacrylylperhydro-s-triazine obtained by the present process was demonstrated by heating a chloroform solution containing about 10% 1,3,5-triacrylylperhydro-s-triazine with a small amount of benzoyl peroxide catalyst. A brittle white resinous product was obtained. The resin is useful for impregnating textile fibers and the like.

The above examples clearly illustrate the ability of the present process to provide 1,3,5-triacrylylperhydro-s-triazines in good yield and essentially free of polymeric impurities. The criticality of employing an excess of the organic nitrile reactant in combination with the acid anhydride is demonstrated. The advantage of the present process over previously known methods for preparing 1,3,5-triacrylylperhydro-s-triazines has also been shown.

I claim:

1. The process for preparing perhydro-s-triazines which comprises reacting, in the presence of an acid catalyst, formaldehyde with 5 to 30% molar excess of an $\alpha,\beta$-olefinically unsaturated nitrile of the formula $$CH_2=\overset{R}{\underset{|}{C}}-C\equiv N$$

wherein R is an alkyl group containing from 1 to 4 carbon atoms in a chlorinated hydrocarbon solvent at a temperature between 50 and 110° C. and in the presence of 0.05 to 0.5 mol per mol of formaldehyde of an acid anhydride and about 0.2 to 2.5 grams per mol formaldehyde of an acid catalyst.

2. The process of claim 1 wherein the chlorinated hydrocarbon solvent is selected from the group consisting of carbon tetrachloride and perchloroethylene and about 0.08 to 0.25 mol per mol formaldehyde of the acid anhydride is employed.

3. The process of claim 2 wheerin the $\alpha,\beta$-olefinically unsaturated nitrile is employed in about 10 to 25% molar excess based on the formaldehyde.

4. The process of claim 3 wherein the $\alpha,\beta$-olefinically unsaturated nitrile is acrylonitrile.

5. The process of claim 4 wherein the acid anhydride is acetic anhydride.

6. The process of claim 3 wherein the $\alpha,\beta$-olefinically unsaturated nitrile is methacrylonitrile.

7. The process of claim 6 wherein the acid anhydride is acetic anhydride.

References Cited

UNITED STATES PATENTS 2,559,835    7/1951    Zerner et al. _____ 260—248
2,568,620    9/1951    Gresham et al. _____ 260—248

OTHER REFERENCES

Emmons et al.: J. Amer. Chem. Soc., vol. 74, pp. 5524–5 (1952).

HENRY R. JILES, Primary Examiner

JOHN M. FORD, Assistant Examiner

U.S. Cl. X.R.

260—88.3, 875, 999